United States Patent
Hind et al.

(10) Patent No.: US 8,826,119 B2
(45) Date of Patent: Sep. 2, 2014

(54) MANAGEMENT OF A WEB SITE THAT INCLUDES DYNAMIC PROTECTED DATA

(75) Inventors: John R. Hind, Raleigh, NC (US); Yongcheng Li, Raleigh, NC (US); Steven W. Pogue, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2251 days.

(21) Appl. No.: 11/350,416

(22) Filed: Feb. 9, 2006

(65) Prior Publication Data

US 2007/0186153 A1  Aug. 9, 2007

(51) Int. Cl.
G06F 3/00 (2006.01)
G06F 17/30 (2006.01)

(52) U.S. Cl.
CPC .................. *G06F 17/3089* (2013.01)
USPC ......................................................... 715/234

(58) Field of Classification Search
USPC .......................................... 715/234, 243, 254
See application file for complete search history.

(56) References Cited

U.S. PATENT DOCUMENTS

| | | |
|---|---|---|
| 2002/0035611 A1 | 3/2002 | Dooley et al. |
| 2002/0138155 A1* | 9/2002 | Bristol .............................. 700/2 |
| 2003/0131048 A1* | 7/2003 | Najork ......................... 709/203 |
| 2003/0131259 A1 | 7/2003 | Barton et al. |
| 2004/0024714 A1* | 2/2004 | Wells et al. ....................... 705/78 |
| 2004/0034799 A1* | 2/2004 | Mikami ......................... 713/201 |
| 2004/0083127 A1 | 4/2004 | Lunsford et al. |
| 2005/0131909 A1 | 6/2005 | Cavagnaro et al. |
| 2005/0144297 A1 | 6/2005 | Dahlstrom et al. |
| 2006/0218629 A1* | 9/2006 | Pearson et al. ...................... 726/8 |
| 2006/0242137 A1* | 10/2006 | Shah et al. ......................... 707/4 |

OTHER PUBLICATIONS

Kyrnin, Jennifer, "Cloaking: What it is and Why You Shouldn't Do It". Printed from http://webdesign.about.com/od/seo/i/aa092704.htrm. Date unknown. Printed on Jan. 13, 2006.
Roy, Sumantra, "Page Cloaking—To Cloak or Not to Cloak". Printed from http://www.payperclicksearchengines.com/to-cloak-or-not-to-cloak.shtml. Date unknown. Printed on Jan. 13, 2006.
Thomason, Larisa, "Invite Search Engine Spiders Into Your Dynamic Web Site". Printed from http://www.webdevelopersjournal.com/articles/spider_dynamic_site.html. Date unknown. Printed on Jan. 13, 2006.

* cited by examiner

*Primary Examiner* — Kyle Stork
(74) *Attorney, Agent, or Firm* — Steven M. Greenberg, Esq.; CRGO Law

(57) ABSTRACT

A solution for managing a web site that includes dynamic protected data is provided. After receiving a request for a web page from a requesting system, the invention determines if the requesting system can be identified as a browser system. If not, then a public web page that does not include dynamic protected data is obtained. Otherwise, a redirect message that includes an alternative address for the web page can be provided, and a protected web page that includes the dynamic protected data can be obtained after authenticating a user.

14 Claims, 9 Drawing Sheets

FIG. 8

| PRODUCT | AVAILABILITY | COST |
|---|---|---|
| PRODUCT A | 100 UNITS | $1000/UNIT |
| PRODUCT B | 50 UNITS | $800/UNIT |
| PRODUCT C | 70 UNITS | $1500/UNIT |
| PRODUCT D | 20 UNITS | $100/UNIT |
| PRODUCT E | 10 UNITS | $400/UNIT |
| PRODUCT F | 60 UNITS | $750/UNIT |
| ● ● ● | | |

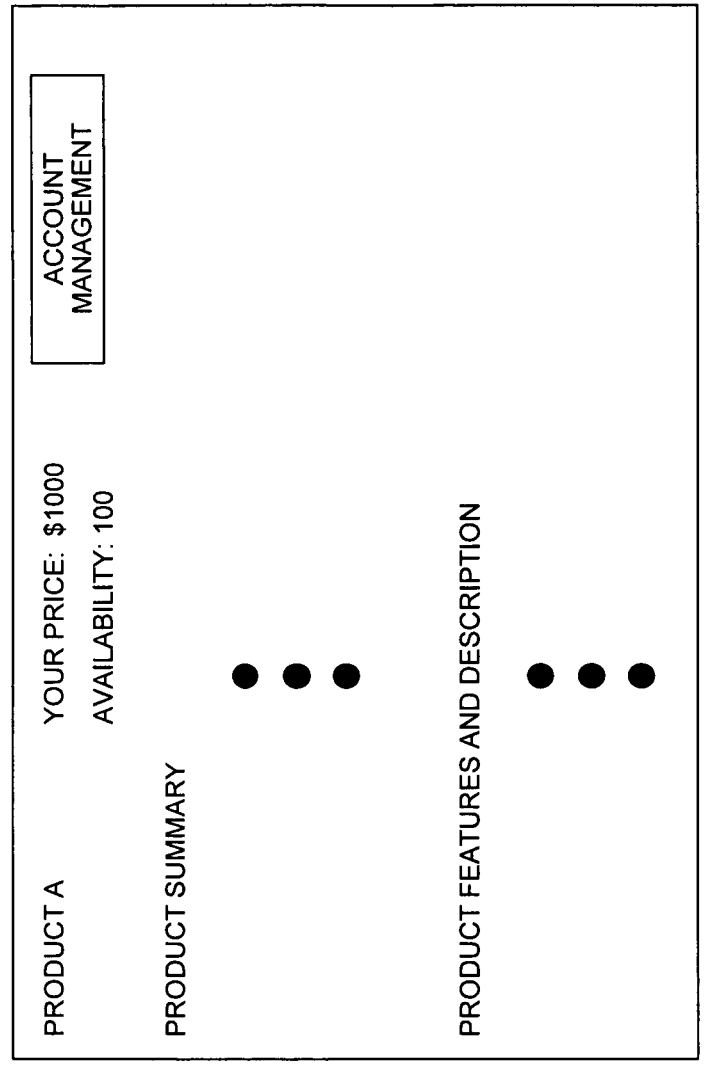

MANAGEMENT OF A WEB SITE THAT INCLUDES DYNAMIC PROTECTED DATA

FIELD OF THE INVENTION

The invention relates generally to web site management, and more particularly, to a solution for managing a web site that includes dynamic protected data.

BACKGROUND OF THE INVENTION

Increasingly, web sites store data in database tables and dynamically generate web pages for presentation to a user by querying the data stored in the database tables. For example, a web page may include a portlet that derives selection criteria based on interactions of the user with other portlets within the web page, and dynamically obtains content for displaying to the user. However, dynamic web pages pose a potential problem for Web crawlers, which are used by search engines to obtain data for indexing various web sites. In particular, these Web crawlers may refuse to crawl dynamic web sites since there is a risk that the Web crawler will end up in a request loop that prevents it from moving on to other web pages (e.g., due to state information being encoded in a cookie or URL "cookie jar" fragment). As a result, the search engines do not index dynamic web pages, which reduces the effectiveness of the search engine and the ability of the web site to attract new users.

The problem is compounded for web sites that include protected data. In this case, the web site may only be available using a security protocol, such as HyperText Transport Protocol Secure (HTTPS) and/or require a log in. The use of a security protocol and/or log in enables the content provided to the user to be filtered and/or customized based on the identity of the user. However, since the Web crawler does not include any ability to be authenticated, it will often bypass web sites that include protected data.

For numerous applications, it is desirable that a Web crawler be able to crawl a web site that includes dynamic protected data. To this extent, the web site may include public data that is desirable to have indexed by a search engine for presentation to users in response to search requests. For example, a merchant may have a pricing structure that varies based on the customer. In this case, the merchant may want to have its product offerings and/or descriptions indexed while the corresponding pricing for the products remains protected. Similarly, a content provider may require registration to view its content. However, the content provider may want summaries of the content included by the search engine to increase traffic to the content provider's web site. In one proposed solution, the merchant and/or content provider pays the search engine to include certain content and links to its web site.

In the more general area of responding to Web crawler requests, some web sites have attempted to "cloak" the content provided to Web crawlers. In particular, when the web site determines that a request is received from a Web crawler, the web site will provide alternative content for processing by the Web crawler. Frequently, the alternative content is designed to make the web site appear higher in the results list for a search engine that uses the Web crawler than it otherwise would if the actual content were provided. Subsequently, when a user selects to visit the web site via the search engine, the actual web page is provided to the user. In general, search engine operators do not approve of web sites that cloak content, and a web site may be removed from being processed by the search engine's Web crawler if it is determined that the web site is cloaking its content.

In view of the foregoing, there exists a need in the art to overcome one or more of the deficiencies indicated herein and/or one or more other deficiencies not expressly discussed herein.

BRIEF SUMMARY OF THE INVENTION

The invention provides a solution for managing a web site that includes dynamic protected data. After receiving a request for a web page from a requesting system, the invention determines if the requesting system can be identified as a browser system. If not, then a public web page that does not include dynamic protected data is obtained. Otherwise, a redirect message that includes an alternative address for the web page can be provided, and a protected web page that includes the dynamic protected data can be obtained after authenticating a user. In this manner, the invention enables public data for a web site, including dynamic public data, to be processed by a searching system and indexed by a search site, while also enabling dynamic protected data to be presented to a user after authentication.

A first aspect of the invention provides a method of managing a web site that includes dynamic protected data, the method comprising: receiving a request for a web page from a requesting system; determining if the requesting system can be identified as a browser system; and obtaining a public web page when the requesting system is not identified as a browser system, wherein the public web page does not include dynamic protected data.

A second aspect of the invention provides a system for managing a web site that includes dynamic protected data, the system comprising: a system for receiving a request for a web page from a requesting system; a system for determining if the requesting system can be identified as a browser system; and a system for obtaining a public web page when the requesting system is not identified as a browser system, wherein the public web page does not include dynamic protected data.

A third aspect of the invention provides a program product stored on a computer-readable medium, which when executed, enables a computer infrastructure to manage a web site that includes dynamic protected data, the program product comprising computer program code for enabling the computer infrastructure to: receive a request for a web page from a requesting system; determine if the requesting system can be identified as a browser system; and obtain a public web page when the requesting system is not identified as a browser system, wherein the public web page does not include dynamic protected data.

A fourth aspect of the invention provides a method of generating a system for managing a web site that includes dynamic protected data, the method comprising: providing a computer infrastructure operable to: receive a request for a web page from a requesting system; determine if the requesting system can be identified as a browser system; and obtain a public web page when the requesting system is not identified as a browser system, wherein the public web page does not include dynamic protected data.

A fifth aspect of the invention provides a business method for managing a web site that includes dynamic protected data, the business method comprising managing a computer infrastructure that performs the process described herein; and receiving payment based on the managing.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 8 shows an illustrative protected web page that can be provided in response to a request for the public web page of FIG. 4.

FIG. 9 shows an illustrative protected web page that can be provided in response to a request for the public web page of FIG. 5.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for managing a web site that includes dynamic protected data. After receiving a request for a web page from a requesting system, the invention determines if the requesting system can be identified as a browser system. If not, then a public web page that does not include dynamic protected data is obtained. Otherwise, a redirect message that includes an alternative address for the web page can be provided, and a protected web page that includes the dynamic protected data can be obtained after authenticating a user. In this manner, the invention enables public data for a web site, including dynamic public data, to be processed by a searching system and indexed by a search site, while also enabling dynamic protected data to be presented to a user after authentication. As used herein, unless otherwise noted, the term "set" means one or more (i.e., at least one).

Figure 1:
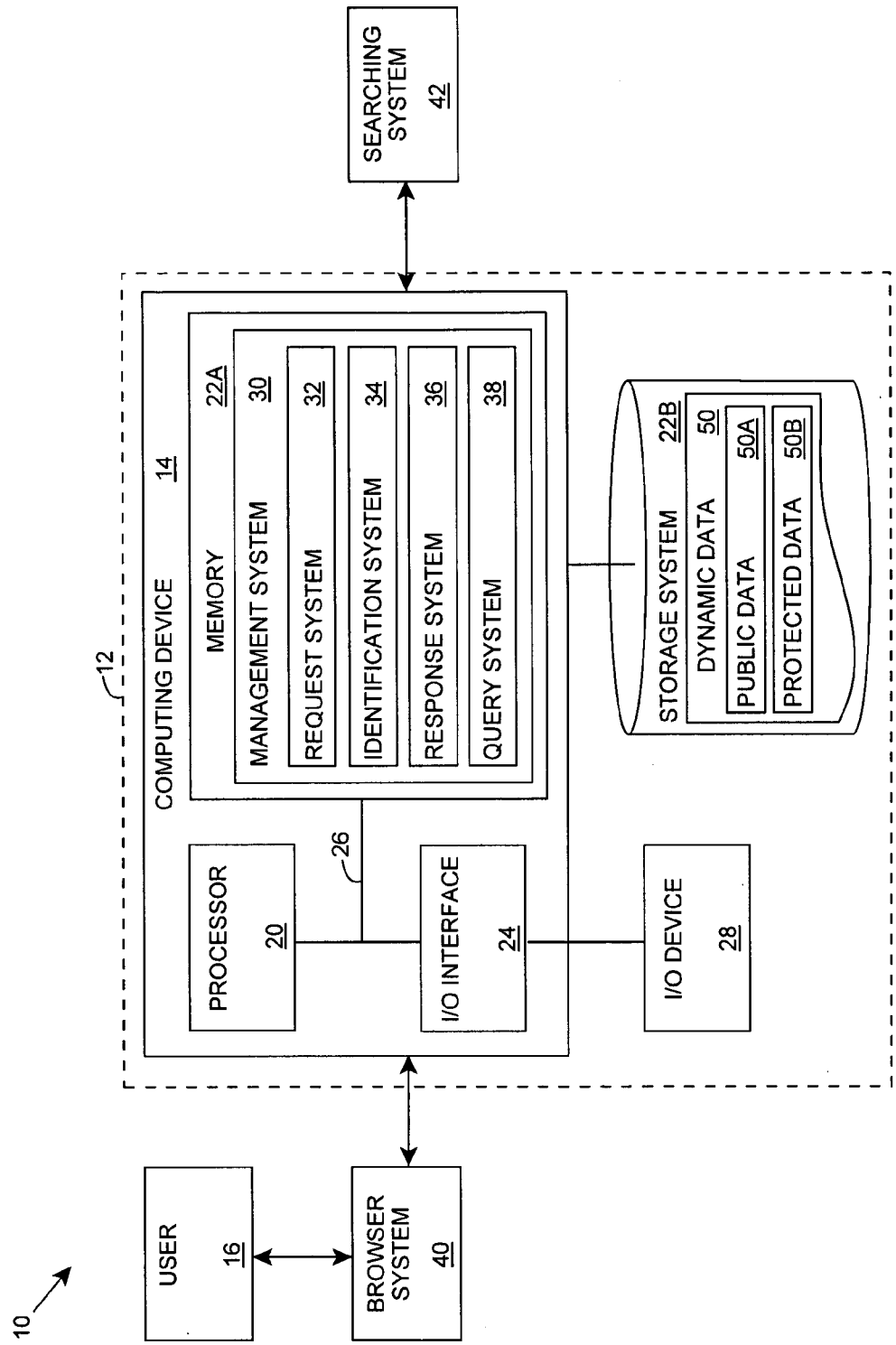
FIG. 1 shows an illustrative environment for managing a web site that includes dynamic protected data according to an embodiment of the invention.

Turning to the drawings, FIG. 1 shows an illustrative environment 10 for managing a web site that includes dynamic protected data 50B according to an embodiment of the invention. To this extent, environment 10 includes a computer infrastructure 12 that can perform the process described herein in order to manage the web site. In particular, computer infrastructure 12 is shown including a computing device 14 that comprises a management system 30, which makes computing device 14 operable to manage the web site by performing the process described herein.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as management system 30, which is stored in memory 22A and/or storage system 22B. While executing computer program code, processor 20 can read and/or write data, such as dynamic data 50, to/from memory 22A, storage system 22B, and/or I/O interface 24. Bus 26 provides a communications link between each of the components in computing device 14. I/O device 28 can comprise any device that enables an individual to interact with computing device 14 or any device that enables computing device 14 to communicate with one or more other computing devices using any type of communications link.

In any event, computing device 14 can comprise any general purpose computing article of manufacture capable of executing computer program code installed thereon (e.g., a personal computer, server, handheld device, etc.). However, it is understood that computing device 14 and management system 30 are only representative of various possible equivalent computing devices that may perform the process described herein. To this extent, in other embodiments, the functionality provided by computing device 14 and management system 30 can be implemented by a computing article of manufacture that includes any combination of general and/or specific purpose hardware and/or computer program code. In each embodiment, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices (e.g., a server cluster) that communicate over any type of communications link, such as a network, a shared memory, or the like, to perform the process described herein. Further, while performing the process described herein, one or more computing devices in computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

As discussed herein, management system 30 enables computer infrastructure 12 to manage a web site that includes dynamic protected data 50B. To this extent, management system 30 is shown including a request system 32, an identification system 34, a response system 36, and a query system 38. Operation of each of these systems is discussed further herein. However, it is understood that some of the various systems shown in FIG. 1 can be implemented independently, combined, and/or stored in memory for one or more separate computing devices that are included in computer infrastructure 12. Further, it is understood that some of the systems and/or functionality may not be implemented, or additional systems and/or functionality may be included as part of computer infrastructure 12.

Regardless, the invention provides a solution for managing a web site. It is understood that the term "web site" comprises any collection of web pages that are accessible over a network, such as the Internet or an Intranet. A "web page" comprises any type of document, such as a text file coded in HyperText Markup Language (HTML), JavaScript, and/or the like, which can be transmitted over the network and displayed by a browser, such as a Web browser. For example, a browser system 40 can include a Web browser that enables a user 16 to view and/or select one or more web pages from the web site. To this extent, management system 30 can receive the request from browser system 40, and provide the requested web page for display at browser system 40.

Users, such as user 16, frequently use a search site to assist user 16 in navigating web sites and/or web pages. The search site enables user 16 to enter a search criteria, which is used to return web sites and/or web pages that match the search criteria. In order to implement this functionality, the search site employs a searching system 42, e.g., a crawler, Web crawler, spider, ant, robot (bot), intelligent agent, etc., which navigates various web sites and indexes the corresponding web pages. In operation, searching system 42 generates and sends a request for a web page at the web site to management system 30. In response, management system 42 can provide a response that includes the requested web page for processing by searching system 42. After indexing the content on the web page, searching system 42 can request another web page, e.g., based on a link present in a previously provided web page, and the process can continue until searching system 42 has processed all web pages for the web site.

As noted previously, management system 30 manages a web site that includes dynamic data 50. To this extent, in responding to a request for a web page, management system 30 can generate the web page based on dynamic data 50. Dynamic data 50 can include dynamic public data 50A and/or dynamic protected data 50B. Dynamic public data 50A comprises dynamic data that can be included in a web page that is provided for display to any user 16 without requiring authentication. In contrast, dynamic protected data 50B comprises dynamic data that can only be included in a web page that is provided for display to a particular set of users 16 after authentication (e.g., via a log in, client certificate, and/or the like).

Figure 2:
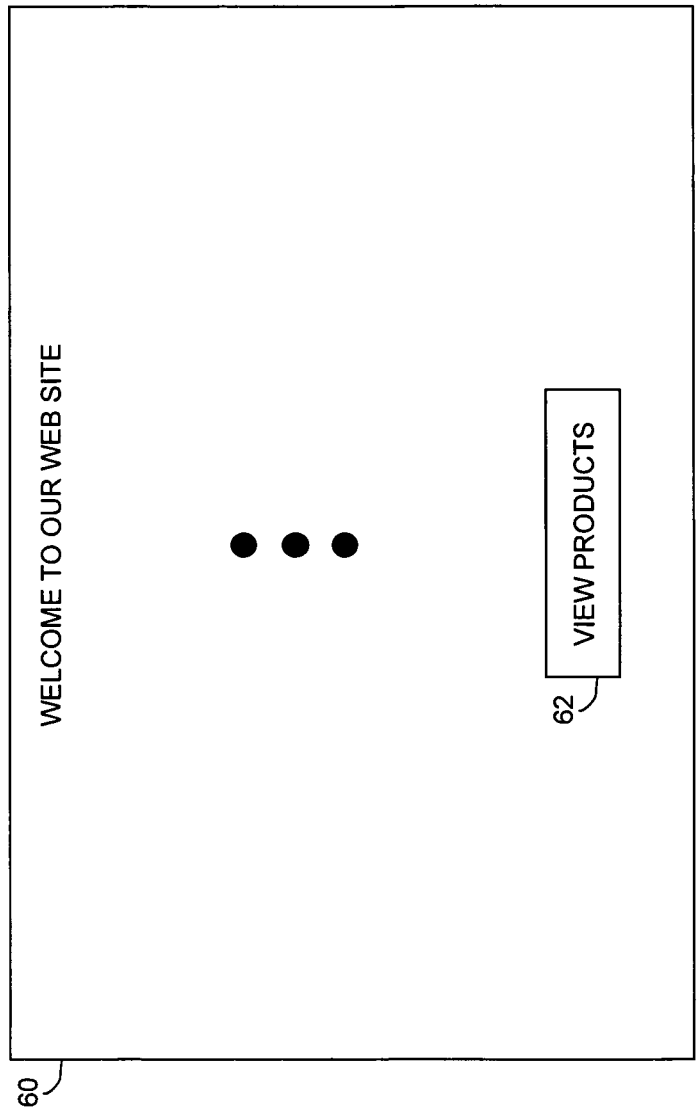
FIG. 2 shows an illustrative web page for a web site.

In any event, request system 32 can receive a request for a web page from a requesting system, such as browser system 40 or searching system 42. The requested web page can comprise a static web page or a web page that includes dynamic data 50. For example, FIG. 2 shows an illustrative web page 60 for a web site. Web page 60 can comprise a "home page", which is the first page that is typically retrieved when accessing the web site. As such, web page 60 can comprise a static web page that includes various information on the web site and/or the corresponding company. In any event, response system 36 can provide web page 60 for processing by the requesting system in response to the request received by request system 32.

Web page 60 is shown including a user interface control 62 that enables access to another web page at the web site. When the requesting system comprises browser system 40, user 16 can use user interface control 62 to generate a request for the other web page, which is forwarded by browser system 40 to management system 30. Alternatively, when the requesting system comprises searching system 42, searching system 42 can generate a request for the other web page based on user interface control 62 after having processed the content of web page 60.

Returning to FIG. 1, request system 32 can receive a request for the web page accessible via user interface control 62 (FIG. 2) from a requesting system. When the requested web page may comprise dynamic protected data 50B, it is desirable that management system 30 respond to a request received from a browser system 40 different from a request received from a searching system 42 since searching system 42 cannot provide any authentication to receive dynamic protected data 50B. To this extent, in order to support requests received from both browser system 40 and searching system 42, request system 32 can determine if the requesting system can be identified as a browser system 40. Request system 32 can attempt to identify the requesting system as a browser system 40 using any known solution. For example, when the request is in the HyperText Transport Protocol (HTTP), a User-Agent field can be included in a header for the request. In this case, request system 32 can determine whether the User-Agent field corresponds to an actual browser.

When request system 32 is unable to identify the requesting system as a browser system 40, management system 30 can process the request as if it were received from searching system 42. In particular, management system 30 can obtain a public web page that does not include any dynamic protected data 50B and provide the public web page for processing by the requesting system. The public web page can comprise a static web page or can comprise a dynamic web page that is generated based on public dynamic data 50A. In the former case, request system 32 can receive the request and forward it to response system 36, which can obtain the corresponding static public web page from a storage system, such as storage system 22B, and provide the static public web page for processing by the requesting system.

Figure 3:
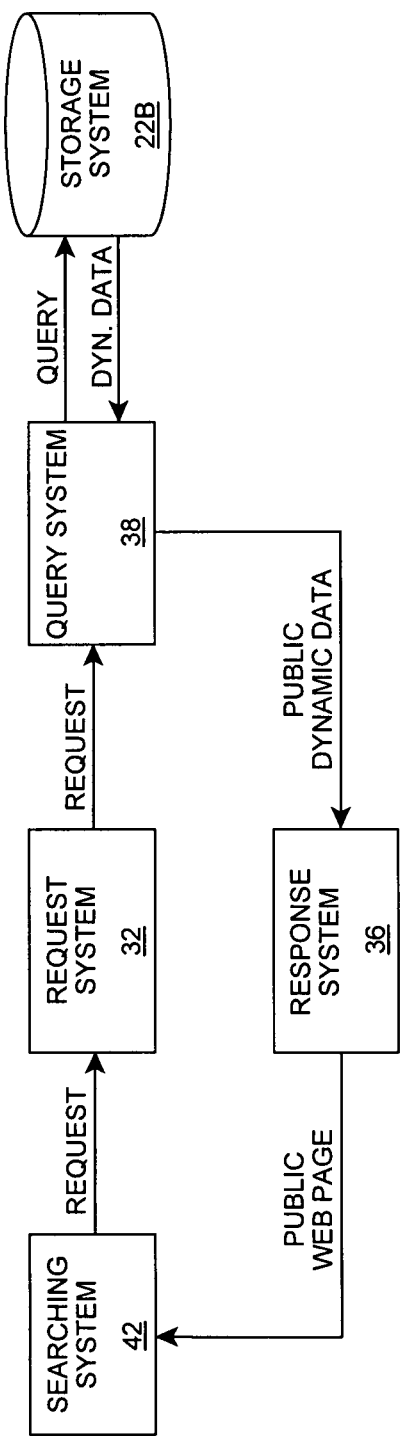
FIG. 3 shows an illustrative process flow for obtaining a dynamic public web page in response to a request received from a searching system according to an embodiment of the invention.

FIG. 3 shows an illustrative process flow for obtaining a dynamic public web page in response to a request received from a searching system 42 according to an embodiment of the invention. In particular, request system 32 can receive the request from searching system 42, and query system 38 can generate a query to obtain dynamic data 50 (FIG. 1) based on the request. Since query system 38 does not include any identification information for the requester, query system 38 can generate a query that obtains only public dynamic data 50A (FIG. 1). Query system 38 can provide the query to storage system 22B, which can respond with public dynamic data 50A corresponding to the query. Subsequently, response system 36 can generate a public web page based on public dynamic data 50A and can provide the public web page for processing by searching system 42.

Figure 4:
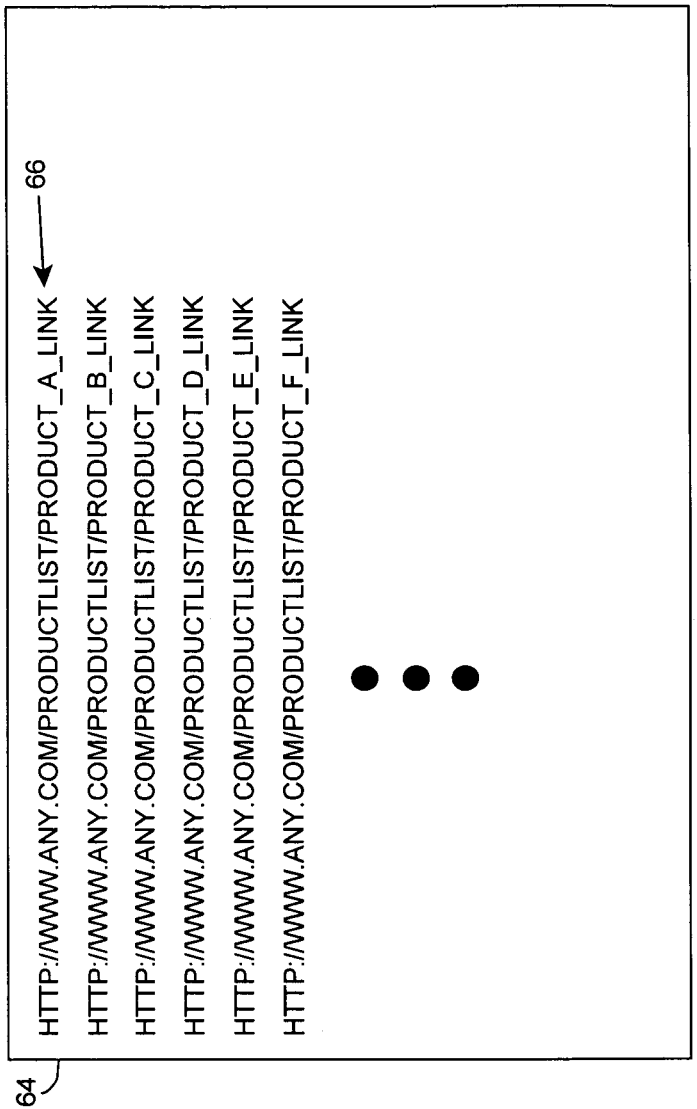
FIG. 4 shows an illustrative public web page that can be obtained in response to a request received based on the user interface control in FIG. 2.

For example, FIG. 4 shows an illustrative public web page 64 that can be obtained in response to a request received based on user interface control 62 (FIG. 2). Since public web page 64 may be only provided to a searching system 42 (FIG. 1), public web page 64 may not include various formatting that would be included for display to user 16 (FIG. 1). However, it is understood that this is only illustrative, and public web page 64 could be formatted for display to user 16. In the latter case, public web page 64 can include various content that is processed by searching system 42 and indexed by a corresponding search site. Regardless, public web page 64 includes various user interface controls, such as user interface control 66, which enable access to one or more additional web pages. In this manner, searching system 42 can successfully navigate, process, and index all of the desired web pages for the web site (e.g., each product offered via the web site). In order to ensure processing by searching system 42, each user interface control 66 can define a link that comprises a static link and/or a pseudo static link (e.g., appears to be static, but is actually a dynamic link) to a corresponding public web page.

Figure 5:
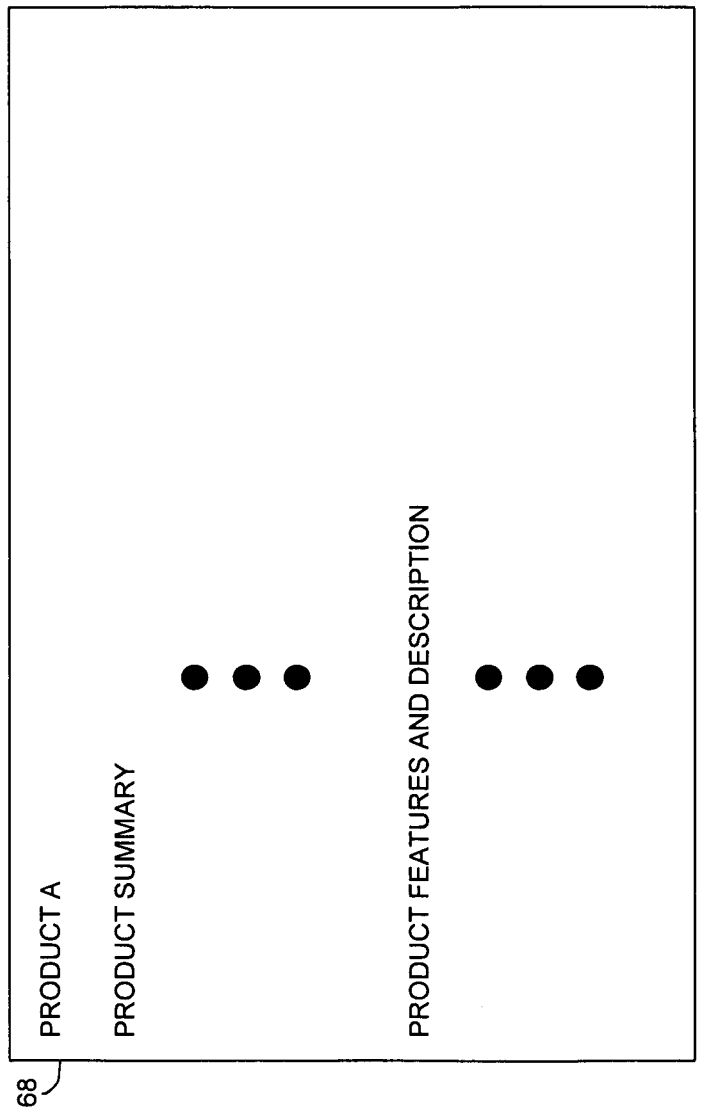
FIG. 5 shows an illustrative public web page that can be obtained in response to a request received based on the user interface control in FIG. 4.

When processing public web page 64, searching system 42 (FIG. 1) can generate and provide management system 30 (FIG. 1) with a request for each web page corresponding to the various user interface controls 66. In response, management system 30 can obtain a public web page and provide the public web page for processing by searching system 42. For example, FIG. 5 shows an illustrative public web page 68 that can be obtained in response to a request received based on user interface control 66 (FIG. 4). As shown, public web page 68 includes various information (e.g., product information) that can be processed by searching system 42 and indexed by a search site using the web page link defined by user interface control 66 (FIG. 4).

Returning to FIG. 1, user 16 may use the search site to locate web pages corresponding to a search criteria. In response, the search site may include a portion of the content processed for public web page 64 (FIG. 4) and/or public web page 68 (FIG. 5) and a corresponding web page link in the list of results for the search criteria. When user 16 selects the result, browser system 40 will generate a request for the particular public web page 64, 68 and provide the request for processing by management system 30. After receiving the request, request system 32 can determine if the requesting system can be identified as a browser system 40. If not, the management system 30 can respond with the requested public web page 64, 68 as discussed herein.

Figure 6:
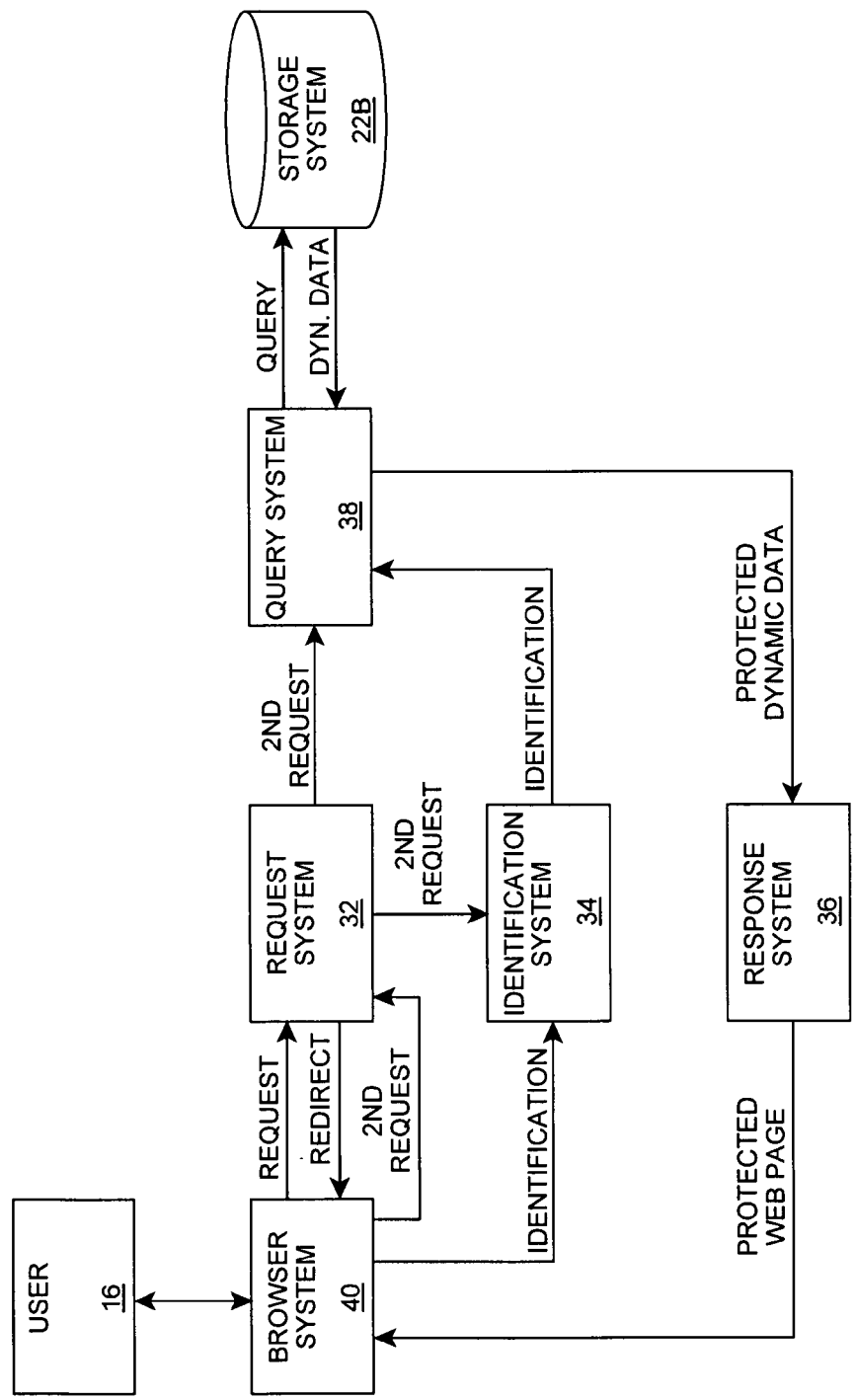
FIG. 6 shows an illustrative process flow for obtaining a protected web page in response to a request from a browser system according to an embodiment of the invention.

However, when the requesting system is identified as a browser system 40, management system 30 can attempt to authenticate user 16. To this extent, FIG. 6 shows an illustrative process flow for obtaining a protected web page in response to a request from a browser system according to an embodiment of the invention. Initially, request system 32 can receive the request and determine that the requesting system can be identified as a browser system 40. In this case, request system 32 can provide a redirect message for processing by browser system 40. The redirect message can indicate that the requested web page is not available at the given address and/or include an alternative address that can be used to obtain the requested web page.

The redirect message can comprise any type of redirect message. For example, in HTTP, the redirect message can include a redirection status code (i.e., in the range of 300-399). In one embodiment, the redirect message comprise a temporary redirect (e.g., status code 307) message, which indicates non-cacheable results. In this case, the redirect message will indicate that the address originally used for the web page remains valid, but its location has been temporarily moved. The alternative address can be included in the Location field in the temporary redirect message. Use of such a message can help prevent the removal of the address (e.g., link) indexed by the search engine as being an invalid entry.

Figure 7:
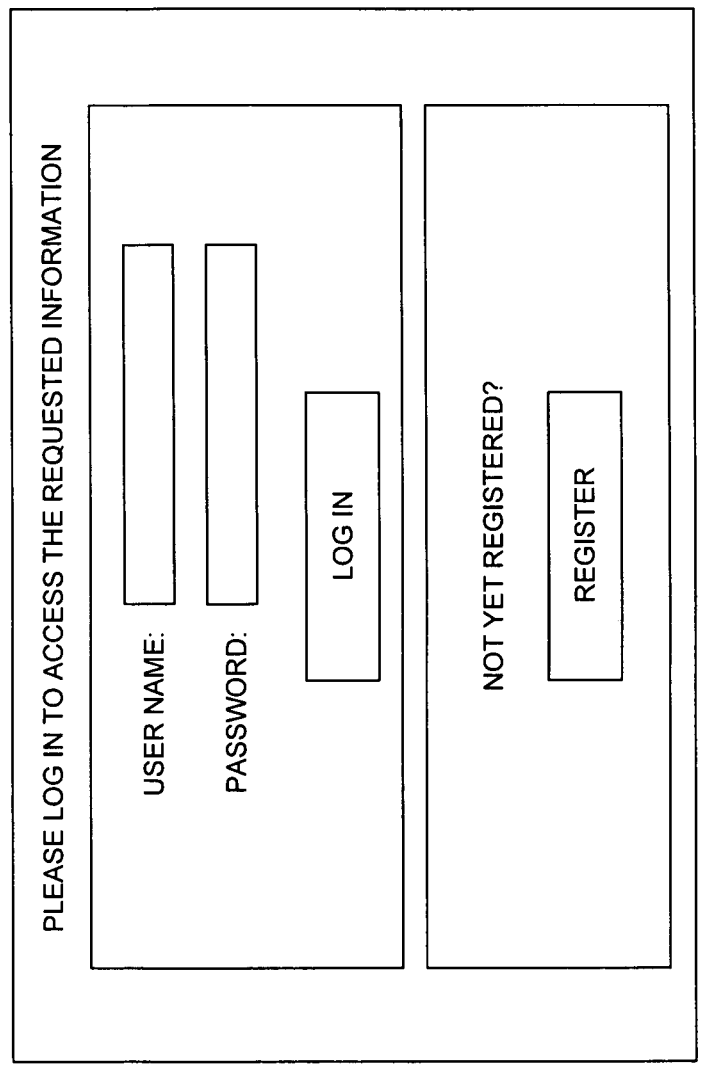
FIG. 7 shows an illustrative log in page.

In response to receiving the redirect message, browser system 40 can generate a second request for the web page at the alternative address, which can be received by request system 32. The web page at the alternative address can comprise protected dynamic data 50B (FIG. 1). In this case, identification system 34 can authenticate browser system 40 using any known solution. Further, identification system 34 can communicate with browser system 40 using a security protocol, such as HyperText Transport Protocol Secure (HTTPS) and/or the like. For example, identification system 34 can provide a log in page for presentation to user 16, which enables user 16 to enter his/her user name and corresponding password. FIG. 7 shows an illustrative log in page 70 according to an embodiment of the invention, which enables identification system 34 to obtain an identification for user 16.

After receiving the log in information, identification system 34 (FIG. 6) can verify the information in a known manner.

Returning to FIG. 6, query system 38 can generate a query based on the requested web page and the identification of user 16. In particular, the query can request dynamic data that is to be included in the web page. Further, the query can specify a particular level/type of access permitted by the identified user 16 to obtain the corresponding protected dynamic data 50B (FIG. 1). Query system 38 can provide the query for processing by storage system 22B, and can receive the results from storage system 22B, which can include protected dynamic data 50B and/or public dynamic data 50A.

Response system 36 can obtain a protected web page that includes dynamic protected data 50B (FIG. 1) based on the authenticated user 16. In particular, response system 36 can generate the protected web page using protected dynamic data 50B and/or public dynamic data 50A obtained by query system 38. Subsequently, response system 36 can provide the protected web page for processing by browser system 40. For example, FIG. 8 shows an illustrative protected web page 72 that can be provided to browser system 40 in response to a request for public web page 64 (FIG. 4). Similarly, FIG. 9 shows an illustrative protected web page 74 that can be provided to browser system 40 in response to a request for public web page 68 (FIG. 5). Protected web pages 72, 74 are each shown including public dynamic data 50A, e.g., the list of products in protected web page 72 and the product summary and product features and description in protected web page 74, as well as protected dynamic data 50B, e.g., availability and price in both protected web pages 72, 74. In either case, the request could have been generated due to the inclusion of the corresponding public web page 64, 68 in search results for a search engine and the selection of the result by user 16 (FIG. 1). It is understood that the web pages and dynamic data shown and discussed herein are only illustrative of numerous applications in which the invention can be applied. To this extent, it is understood that the claimed invention is not limited to the illustrative application shown and discussed herein.

While shown and described herein as a method and system for managing a web site that includes dynamic protected data, it is understood that the invention further provides various alternative embodiments. For example, in one embodiment, the invention provides a program product stored on a computer-readable medium, which when executed, enables a computer infrastructure to manage the web site. To this extent, the computer-readable medium includes program code, such as management system 30 (FIG. 1), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), as a data signal traveling over a network (e.g., during a wired/wireless electronic distribution of the program product), and/or the like.

In another embodiment, the invention provides a method of generating a system for managing a web site that includes dynamic protected data. In this case, a computer infrastructure, such as computer infrastructure 12 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a business method that performs the process described herein on a subscription, advertising, and/or fee basis. That is, a service provider, such as a web hosting service provider, could offer to manage a web site that includes dynamic protected data as described herein. In this case, the service provider can manage (e.g., create, maintain, support, etc.) a computer infrastructure, such as computer infrastructure 12 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing a web site that includes dynamic protected data, the method comprising:
   receiving, at a computing device a request for a web page from a requesting system;
   identifying, by the computing device, whether the requesting system is a browser system;
   obtaining a public web page using the at least one computing device in response to the requesting system not being identified as a browser system, wherein the public web page includes dynamic public data and does not include dynamic protected data;
   providing the public web page for processing by the requesting system using the at least one computing device in response to the requesting system not being identified as a browser system.

2. The method of claim 1, wherein the obtaining includes:
   querying a data store for dynamic public data; and
   generating the public web page based on the dynamic public data.

3. The method of claim 1, wherein
   the identifying includes obtaining a value for a User-Agent field in the request.

4. A system for managing a web site that includes dynamic protected data, the system comprising:
   at least one computing device including:
      a system for receiving a request for a web page from a requesting system;
      a system for identifying whether the requesting system is as a browser system; and
      a system for obtaining a public web page in response to the requesting system being not identified as a browser system, wherein
   the public web page includes dynamic public data and does not include dynamic protected data.

5. The system of claim 4, wherein the system for obtaining includes:
   a system for querying a data store for dynamic public data; and
   a system for generating the public web page based on the dynamic public data.

6. The system of claim 4, wherein the at least one computing device further including a system for providing a redirect message that includes an alternative address for the web page for processing by the requesting system when the requesting system is identified as a browser system.

7. The system of claim 6, wherein the at least one computing device further including:
   a system for receiving a request for the web page at the alternative address from the requesting system; and
   a system for authenticating a user of the requesting system.

8. The system of claim 6, wherein the at least one computing device further including a system for obtaining a protected web page that includes dynamic protected data based on the authenticated user.

9. A program product stored on a computer-readable storage medium, which when executed, enables a computer infrastructure to manage a web site that includes dynamic protected data, the program product comprising computer program code for enabling the computer infrastructure to:
   receive a request for a web page from a requesting system;
   identify whether the requesting system is a browser system; and
   obtain a public web page in response to the requesting system not being identified as a browser system, wherein
   the public web page includes dynamic public data and does not include dynamic protected data.

10. The program product of claim 9, wherein the program code for enabling the computer infrastructure to obtain enables the computer infrastructure to:
    query a data store for dynamic public data; and
    generate the public web page based on the dynamic public data.

11. The program product of claim 9, further comprising program code for enabling the computer infrastructure to provide a redirect message that includes an alternative address for the web page for processing by the requesting system when the requesting system is identified as a browser system.

12. The program product of claim 11, further comprising program code for enabling the computer infrastructure to:
    receive a request for the web page at the alternative address from the requesting system; and
    authenticate a user of the requesting system.

13. The program product of claim 11, further comprising program code for enabling the computer infrastructure to obtain a protected web page that includes dynamic protected data based on the authenticated user.

14. A method of generating a system for managing a web site that includes dynamic protected data, the method comprising:
  providing a computer infrastructure operable to:
    receive a request for a web page from a requesting system;
    identify whether the requesting system is a browser system; and
    obtain a public web page in response to the requesting system not being identified as a browser system, wherein
  the public web page includes dynamic public data and does not include dynamic protected data.

* * * * *